United States Patent [19]

Draghetti

[11] Patent Number: 5,486,081
[45] Date of Patent: Jan. 23, 1996

[54] DEVICE FOR FEEDING REELS ON TO A USER MACHINE

[75] Inventor: Fiorenzo Draghetti, Medicina, Italy

[73] Assignee: G.D Societa' Per Azioni, Bologna, Italy

[21] Appl. No.: 66,722

[22] Filed: May 24, 1993

[30] Foreign Application Priority Data

May 26, 1992 [IT] Italy .................................. BO92A0211

[51] Int. Cl.⁶ ..................................................... B65H 3/00
[52] U.S. Cl. ............................ 414/225; 414/783; 242/560
[58] Field of Search ...................................... 414/222, 225, 414/796.7, 797, 908, 910, 911, 924, 926, 783, 758, 763; 198/403, 464.2; 108/144; 242/58.6, 79; 187/267

[56] References Cited

U.S. PATENT DOCUMENTS 3,776,393  12/1973  Bargstedt .............................. 414/797 X
4,141,457   2/1979  Nocek .................................. 414/783 X
4,589,811   5/1986  Riccardo et al. ................... 242/58.6 X
4,762,219   8/1988  Walters et al. ..................... 198/464.2 X

FOREIGN PATENT DOCUMENTS 1552527  9/1979  United Kingdom .
2058022  4/1981  United Kingdom .............. 242/67.1 R
2101097  1/1983  United Kingdom .

Primary Examiner—Donald W. Underwood
Attorney, Agent, or Firm—Ladas & Parry

[57] ABSTRACT

A device for feeding reels to a user machine wherein a stack of reels is fitted on to the vertical guide of a slide of a lifting device; the slide defining a supporting surface for the stack and being moved along the guide by a screw-nut screw device controlled by a control system via a system of sensors, so as to successively feed the reels into a pickup station wherein the reels are fed successively, by a pickup arm, on to a conveyor for feeding the reels to the user machine.

7 Claims, 1 Drawing Sheet

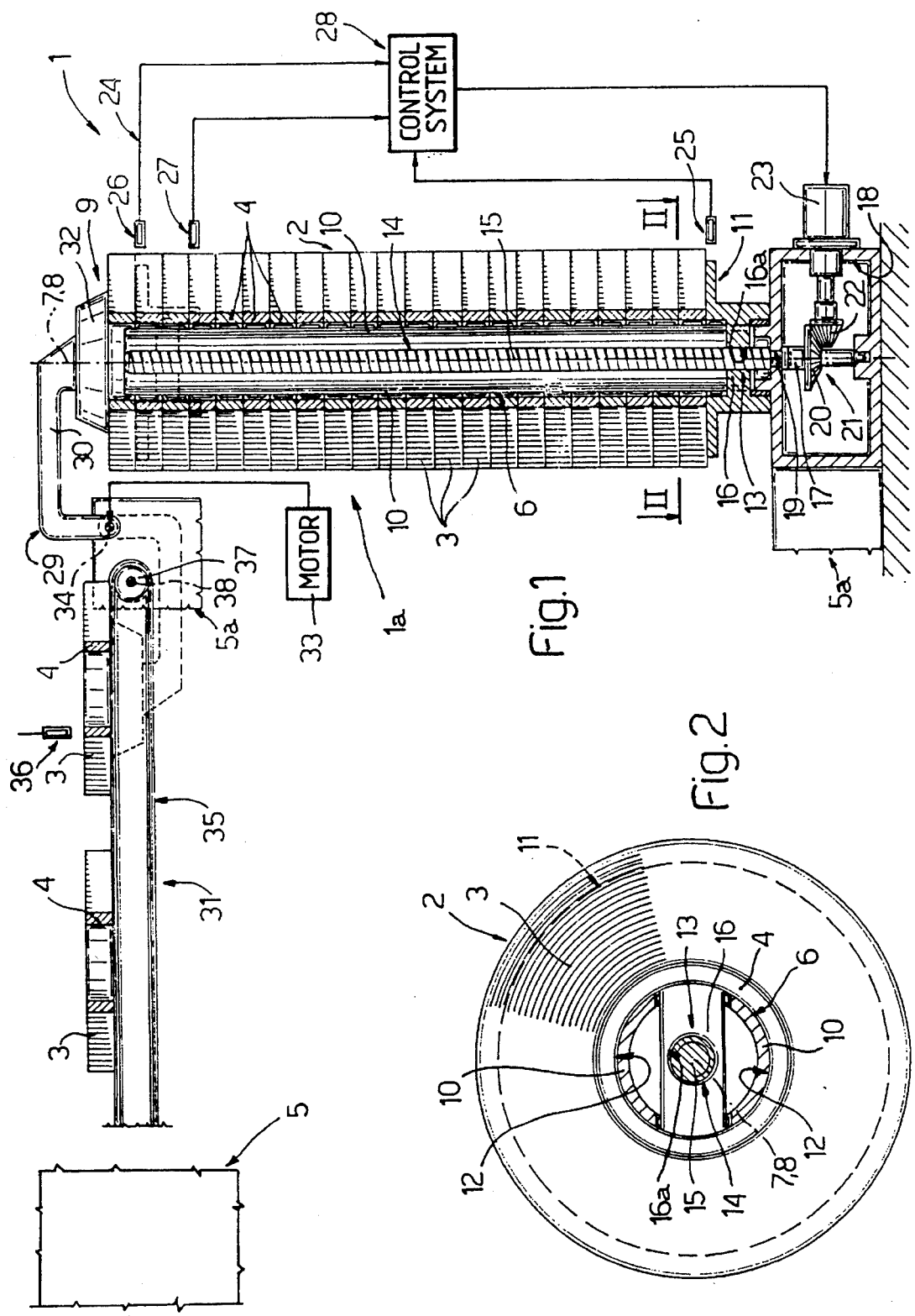

DEVICE FOR FEEDING REELS ON TO A USER MACHINE

BACKGROUND OF THE INVENTION

The present invention relates to a device for feeding reels on to a user machine.

In particular, the present invention relates to a device for feeding reels of strip material from which to produce and/or pack cigarettes.

Cigarette manufacturing machines normally present one or more supports for respective reels from which wrapping material employed in the various manufacturing and packing stages is reeled off.

The reel supports are normally located in relatively safe positions on the machines, at any rate in such a position as not to interfere with the work of the machine operators, so that the reels must normally be lifted up on to a level with the respective supports.

SUMMARY OF THE INVENTION

It is an object of the present invention to provide a straightforward, low-cost device for feeding reels on to a user machine, and which provides for fully automatically lifting a succession of reels up to the operating height, and feeding them, at said height, on to the user machine.

According to the present invention, there is provided a device for feeding reels on to a user machine, characterized by the fact that it comprises a vertical lifting device designed to receive a stack of said reels; a substantially horizontal feed conveyor for feeding a succession of said reels to said user machine; a pickup station located between the top end of said lifting device and the input end of said conveyor; and transfer means for successively transferring the reels from said top end into an unloading position on said input end; said lifting device comprising means for step feeding the reels to said top end, with the reels laid flat and substantially parallel to the transportation surface defined by said conveyor.

According to a preferred embodiment of the device as described above, said step feed means comprise a guide having a first substantially vertical axis; a slide connected in axially sliding manner to the guide so as to travel along the first axis and defining a supporting surface for at least one stack of reels having a second axis parallel to said first axis; drive means for moving the slide between a first and second limit position, so as to successively feed the reels into said pickup station; and means for controlling said drive means.

BRIEF DESCRIPTION OF THE DRAWINGS

A non-limiting embodiment of the present invention will be described by way of example with reference to the accompanying drawings, in which:

FIG. 1 shows a partially sectioned side view and partial block diagram, with parts removed for clarity, of a preferred embodiment of the device according to the present invention;

FIG. 2 shows a larger-scale section along line II—II in FIG. 1.

DETAILED DESCRIPTION OF THE INVENTION

Numeral 1 in FIG. 1 indicates a device for feeding reels of wrapping material on to a user machine.

Device 1 comprises a lifting device 1a defining a vertical store for housing a stack 2 of reels 3 of strip material wound about core 4 of respective reel 3 and from which, for example the reels are red, to produce or pack cigarettes (not shown) on user machine 5.

Device 1a comprises a base 5a to which is connected integrally one end of a cylindrical guide 6 having a substantially vertical axis 7 and a diameter approximately equal to but no larger than the inside diameter of cores 4. Stack 2 is fitted on to guide 6, with reels 3 laid flat one on top of the other, and with their respective axes 8 substantially coinciding with one another and with axis 7. Guide 6, which extends upwards from a bottom portion of base 5a, presents its top end at a reel pickup station 9, and is defined by two facing, parallel rods 10, each having a C-shaped cross section with its concavity facing the other rod 10.

Device 1a also comprises a slide 11 connected in sliding manner to guide 6 and defined by a circular plate located between stack 2 and base 5a, perpendicular to and coaxial with axis 7, and having two adjacent semicircular openings 12, each engaged in axially sliding manner by a respective rod 10. Slide 11 defines a substantially horizontal supporting surface for stack 2, and is moved along axis 7, by a screw-nut screw drive system 13, between a first bottom limit position (shown in solid lines in FIG. 1) wherein slide 11 rests on base 5a, and a second top limit position (shown by dotted lines in FIG. 1) wherein slide 11 is located at station 9.

Screw-nut screw system 13 comprises a screw 14 extending coaxially with axis 7 and having a threaded portion 15 extending between rods 10 and engaging a nut screw 16 defined by a thread formed on the inner surface of a hole 16a formed centrally through slide 11 between openings 12. Screw 14 also presents a bottom end portion 17 extending inside a chamber 18 in base 5a through an opening 19, and connected in rotary and axially-fixed manner to base 5a. Portion 17 is fitted with a first bevel gear 20 forming part of a gear mechanism 21 also comprising a second bevel gear 22 meshing with gear 20 and fitted on to the output shaft of an electric motor 23 integral with base 5a and forming part of system 13.

Device 1a also has a unit 24 for detecting the presence and location of reels 3 along guide 6. Unit 24 comprises a first and second known sensor, 25 and 26, located along guide 6 at the first and respectively second limit positions of slide 11, and which provide respectively for detecting full capacity of the store and the presence of a reel 3 at station 9. Unit 24 also comprises a third sensor 27 located between sensors 25 and 26 and substantially in the vicinity of station 9, for detecting imminent runout of reels 3 on device 1a; and a control system 28 for emitting a control signal for motor 23 in response to the signals emitted by sensors 25, 26 and 27.

Again with reference to FIG. 1, feed device 1 comprises a pickup unit 29 having an arm 30 by which reels 3 lifted successively by device 1a up pickup station 9 are picked up successively and fed, lying flat, on to the input end of a conveyor 31 defining a substantially horizontal transportation surface perpendicular to axes 8, and designed to receive reels 3 successively from arm 30 and feed them on to user machine 5. The free end of arm 30 is fitted preferably with a suction cup type pickup head 32, and the opposite end of arm 30 is hinged to a portion of base 5a on a level with pickup station 9. Arm 30 is connected to a motor 33 so as to swing about an axis 34, perpendicular to axis 7 and to the FIG. 1 plane, between a pickup position (shown by the solid lines) wherein it picks up reel 3 at station 9, and an unloading position (shown by the dotted lines) whereat it unloads reel 3 on to the delivery branch of conveyor 31.

Conveyor 31 is defined by two parallel endless belts 35 (only one is shown in FIG. 1) arranged side by side and separated so as to define, in between, a gap enabling arm 30 to move between said pickup position and said unloading position, in which provision is made for a sensor 36 connected, in a manner not shown, to control system 28, and which provides for detecting the presence or absence of reel 3 at said unloading position. Each belt 35 is looped about two guide rollers 37 (only one is shown in FIG. 1) fitted in a fixed position to base 5a and rotated about respective axes 38, parallel to axis 34, by a drive unit (not shown).

Operation of device 1 will now be described commencing from the condition in which conveyor 31 has just been activated so as to feed reels 3 one step towards machine 5, thus clearing the unloading position; slide 11 is set to the first limit position supporting a full stack 2 of reels 3; and arm 30 is set to the pickup position with head 32 engaging the top reel 3 in stack 2.

In the above condition, sensor 36 detects the absence of a reel 3 at the unloading position and supplies an enabling signal to control system 28, which, on receiving the signal, activates motor 33 so as to rotate arm 30 about axis 34 and feed a reel 3 to the unloading position on conveyor 31.

Upon reel 3 being picked up, sensor 26 detects the absence of a reel 3 at station 9 and supplies a signal to control system 28 to activate motor 23, which, via gear mechanism 21, in turn rotates screw 14 about axis 7 through such an angle as to raise slide 11 and so feed the next reel 3 to station 9. At this point, motor 33 is again activated to restore arm 30 to the pickup position.

The above cycle is repeated for each forward step of conveyor 31 until no further reels are detected by sensor 27, thus indicating imminent runout of reels 3 being fed upwards by device 1a. Sensor 27 therefore supplies a signal to control system 28, which, after a given number of pickup operations equal to the number of reels 3 left on slide 11, arrests slide 11 to enable another stack 2 to be loaded. Upon stack 2 being loaded, by lowering slide 11 in steps to the bottom limit position, a signal is supplied by sensor 25 to control system 28, which, at this point, again provides the above pickup cycle on receiving the enabling signal from sensor 36.

I claim:

1. A device for feeding reels to a user machine, comprising a vertical lifting device having a top end and designed to receive a stack of said reels; a substantially horizontal feed conveyor for feeding a succession of said reels to said user machine; said feed conveyor having an input end; and transfer means for successively transferring the reels from said top end of the lifting device to an unloading position at said input end of said conveyor; said lifting device comprising means for step feeding the reels to said top end, with the reels laid flat and substantially parallel to a transportation surface defined by said conveyor, said step feeding means comprising a guide and a slide; said guide extending through the slide and having a first substantially vertical axis; said slide being coupled in axially sliding manner to the guide to travel along the first axis, and defining a supporting surface for supporting said stack of reels along a second axis coinciding with said first axis; drive means for moving the slide between first and second limit positions, so as to feed the reels successively towards the top end of the lifting device and means for controlling said drive means; said drive means comprising screw-nut screw transmission means and a motor for driving said transmission means; said transmission means comprising a powered, axially fixed screw mounted for rotation about said first axis, and a nut screw threadably engaged with said powered screw and integral with said slide; said powered screw extending along said aligned first and second axes; said slide comprising an annular plate element, which defines within said plate two openings on opposite sides of said nut screw; said guide being a tubular guide comprising two rods, each engaged in a respective said opening in axially sliding manner with said slide.

2. A device as claimed in claim 1, wherein said control means comprises first and second sensors respectively located at said unloading position and said second limit position of said slide, for respectively detecting the presence of a reel at the unloading position and at the pickup station; and a control system to emit a control signal for said drive means in response to a signal emitted by said sensors.

3. A device as claimed in claim 2, further comprising a third sensor adjacent to said second sensor in proximity to said top end; said third sensor being designed to detect imminent runout of the reels on said slide.

4. A device as claimed in claim 3, wherein said nut screw comprising a central aperture through which said fixed screw extends.

5. A device as claimed in claim 4, wherein said nut screw is fixed to said .annular plate element.

6. A device as claimed in claim 5, wherein said drive screw extends coaxially in said aperture in said annular plate element.

7. A device as claimed in claim 6, wherein said rods have curved cross-sections corresponding to the openings in said annular plate element.

* * * * *